(12) United States Patent
Yoshida

(10) Patent No.: US 11,496,085 B2
(45) Date of Patent: Nov. 8, 2022

(54) MOTOR DRIVE APPARATUS

(71) Applicant: Toshiba Mitsubishi-Electric Industrial Systems Corporation, Chuo-ku (JP)

(72) Inventor: Naotsugu Yoshida, Tokyo (JP)

(73) Assignee: Toshiba Mitsubishi-Electric Industrial Systems Corporation, Chuo-ku (JP)

( * ) Notice: Subject to any disclaimer, the term of this patent is extended or adjusted under 35 U.S.C. 154(b) by 116 days.

(21) Appl. No.: 16/899,893

(22) Filed: Jun. 12, 2020

(65) Prior Publication Data
US 2020/0313597 A1 Oct. 1, 2020

Related U.S. Application Data

(63) Continuation of application No. PCT/JP2017/046114, filed on Dec. 22, 2017.

(51) Int. Cl.
*H02P 29/028* (2016.01)
*B66D 1/12* (2006.01)
(Continued)

(52) U.S. Cl.
CPC .............. *H02P 29/028* (2013.01); *B66D 1/12* (2013.01); *H02P 27/045* (2013.01); *H02P 27/085* (2013.01); *B66C 13/26* (2013.01)

(58) Field of Classification Search
CPC ...... H02P 29/028; H02P 27/045; H02P 3/187; B66D 1/12; B66C 13/26; H02M 7/5395; H02M 5/458; H02M 3/156; H02M 1/007
See application file for complete search history.

(56) References Cited

U.S. PATENT DOCUMENTS 4,519,479 A * 5/1985 Tanahashi ............. B66B 5/0031
187/289
5,285,029 A * 2/1994 Araki ..................... B66B 1/302
187/290
(Continued)

FOREIGN PATENT DOCUMENTS

JP 11 -299290 A 10/1999
JP 2001 -008496 A 1/2001
(Continued)

OTHER PUBLICATIONS

International Search Report dated Mar. 13, 2018 in PCT/JP2017/046114 filed on Dec. 22, 2017, citing documents AA-AC & AP-AS therein, 2 pages.

*Primary Examiner* — Said Bouziane
(74) *Attorney, Agent, or Firm* — Oblon, McClelland, Maier & Neustadt, L.L.P.

(57) ABSTRACT

A motor drive apparatus that can continue operation within the upper limit of system control even if a voltage drop of an AC power source occurs during operation of a motor used for a hoist or a crane is provided. The inverter control unit of the motor drive apparatus includes a speed reference setting means for setting the rotation speed of the motor, means for detecting a speed deviation between the output of the rotation speed detection means for detecting the rotation speed of the motor and the output of the speed reference setting means, means for controlling the output current of the inverter according to the output of the speed deviation. The speed reference setting means includes a correction circuit for correcting an external speed command given from outside. The correction circuit corrects the external speed command according to a deviation between a detection value of a DC voltage and a first reference value when a voltage drop signal is received from the voltage drop detec- (Continued)

tion means, and makes the corrected speed command as the output of the speed reference setting means.

6 Claims, 6 Drawing Sheets

(51) Int. Cl.
*H02P 27/04* (2016.01)
*H02P 27/08* (2006.01)
*B66C 13/26* (2006.01)

(56) References Cited

U.S. PATENT DOCUMENTS

| | | | |
|---|---|---|---|
| 5,329,217 A | 7/1994 | Kerkman et al. | |
| 6,198,240 B1* | 3/2001 | Notohara | H02M 5/458 |
| | | | 318/268 |
| 2009/0058333 A1* | 3/2009 | Okada | B66B 1/308 |
| | | | 318/380 |
| 2011/0194318 A1* | 8/2011 | Kono | H02M 7/53875 |
| | | | 363/37 |
| 2015/0349681 A1* | 12/2015 | Liu | H02P 27/06 |
| | | | 318/400.21 |
| 2015/0365024 A1 | 12/2015 | Myoen et al. | |
| 2016/0172993 A1 | 6/2016 | Yuasa et al. | |

FOREIGN PATENT DOCUMENTS

| | | |
|---|---|---|
| JP | 2013-198345 A | 9/2013 |
| JP | 2014-147188 A | 8/2014 |
| WO | WO 2015/045076 A1 | 4/2015 |

\* cited by examiner

MOTOR DRIVE APPARATUS

CROSS-REFERENCE TO RELATED APPLICATION

This application is based upon and claims the benefit of priority from the prior PCT Patent Application No. PCT/JP2017/46114, filed on Dec. 22, 2017, the entire contents of which are incorporated herein by reference.

TECHNICAL FIELD

The embodiment of the present invention relates to a motor drive apparatus including an inverter and a converter that drives a motor.

BACKGROUND ART

In a motor drive apparatus composed of a converter and an inverter used for hoisting a mine or hoisting a crane, if a voltage of an AC power source drops, the motor drive apparatus becomes uncontrollable and there is a risk of dropping luggage. Conventionally, in order to prevent this, when the voltage drop of the AC power supply is detected, the motor drive apparatus is stopped and the driving motor is stopped by the brake. Also, a method is known in which when the AC power supply fails during acceleration control of the inverter, the acceleration control is stopped and regenerative braking is forcibly started (see Patent Document 1).

PRIOR ART DOCUMENT

Patent Document

Patent document 1: Japanese Patent Publication No. 2001-08496

SUMMARY OF THE INVENTION

Problem to be Solved by the Invention

However, according to the above-described conventional method, for example, since the motor drive apparatus stops while the load is lifted, it takes time to return and restart, and there is a problem that the work efficiency is poor. Further, in the method described in Patent Document 1, since the DC voltage fluctuates greatly and regenerative braking is forcibly started, if the converter cannot regenerate to the AC power supply side, DC voltage of the motor drive apparatus increases, and DC overvoltage occurs. So, there is a possibility that the motor drive apparatus stops.

The present invention has been made in order to solve the above-described problems. It is an object of the present invention to provide a motor drive apparatus including a converter and an inverter which can continue the operation with the motor, by detecting the voltage drop of the AC power supply by the motor drive apparatus, thereby preventing the motor drive apparatus from stopping within an allowable range of the apparatus.

Means for Solving the Problem

In order to achieve the above object, a motor drive apparatus according to the present invention comprises a converter that receives an AC power from an AC power supply and supplies it to a DC circuit, an inverter that converts the power from the DC circuit into a variable frequency AC power, and drives an motor used for the hoist, a voltage drop detector for detecting a voltage drop of the AC power supply, a converter control unit for controlling the converter, a DC voltage detector for detecting the DC voltage of the DC circuit, and an inverter control unit for controlling the inverter, the inverter control unit includes a rotation speed detector for detecting the rotation speed of the motor, a speed reference setting unit for setting the rotation speed of the motor, a circuit for detecting a speed deviation which is a deviation from an output of the rotation speed detector and an internal speed command outputted from the speed reference setting unit, and a circuit for controlling an output current of the inverter according to the output of the circuit for detecting speed deviation, wherein, the speed reference setting unit has a correction circuit for correcting an external speed command given from the outside, and is characterized in that, the correction circuit corrects the external speed command according to a deviation between a detection value of the DC voltage detector and a first reference value when a voltage drop signal is received from the voltage drop detector, and makes the corrected speed command as the output of the speed reference setting unit.

Effects of the Invention

According to the present embodiment, by detecting the voltage drop of the AC power supply and correcting the speed command of the rotation speed of the motor, the motor drive apparatus is prevented from stopping, and the apparatus is provided that can be operated within the allowable range of the apparatus.

EMBODIMENT TO PRACTICE THE INVENTION

Hereinafter, embodiment of the present invention will be described with reference to the drawings.

Embodiment 1

Figure 1:
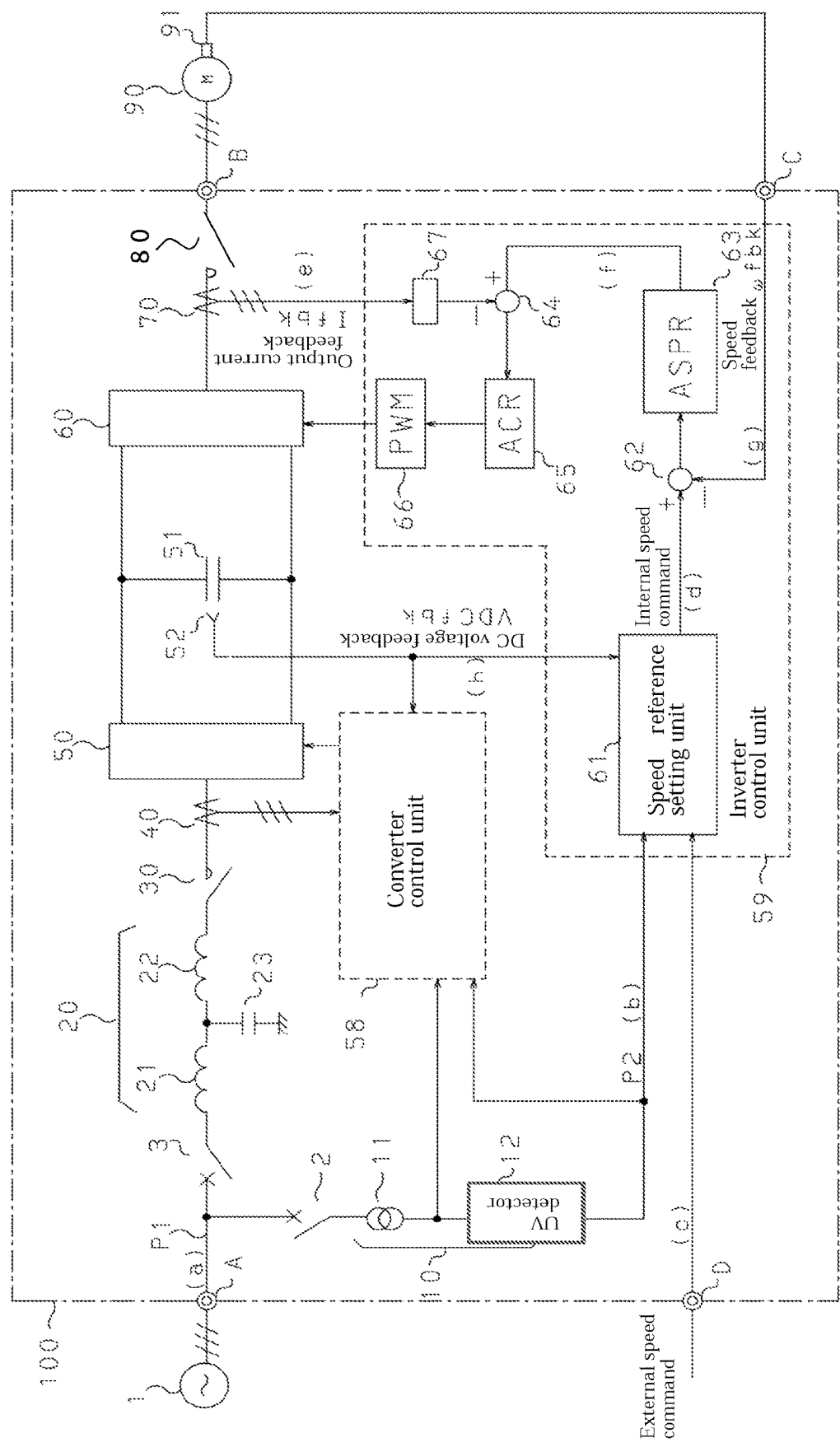
FIG. 1 is a schematic configuration diagram of a motor drive apparatus according to a first embodiment.

FIG. 1 is a schematic configuration diagram of the motor drive apparatus 100 according to the first embodiment.

An AC power supply 1 is connected to a terminal A of the motor drive apparatus 100 and supplies an AC power to the motor drive apparatus 100.

In order to drive a motor 90 having a hoist or the like as a load, the motor drive apparatus 100 converts a DC power output from a converter 50 into three-phase AC power by an inverter 60, and outputs it to a terminal B of the motor drive apparatus 100 via an output current detector 70 and an electromagnetic switch 80.

Thus, three-phase AC power is supplied to the motor 90 connected to the terminal B of the motor drive apparatus 100. The motor 90 is, for example, an electric motor for hoisting and lowering a crane or the like.

The motor drive apparatus 100 includes an instantaneous voltage drop detector 10, a filter unit 20, an electromagnetic switch 30, an input current detector 40, the converter 50, the inverter 60, the output current detector 70, the electromagnetic switch 80, a converter control unit 58, an inverter control unit 59, and circuit breakers 2 and 3.

The instantaneous voltage drop detector (voltage drop detecting means) 10 is connected to a terminal A of the motor drive apparatus 100 via the circuit breaker 2 and detects a voltage drop of the AC power supply 1 connected to the terminal A.

The instantaneous voltage drop detector 10 includes a transformer 11 and an instantaneous under voltage detector 12 (hereinafter, referred to as an UV detector 12). The transformer 11 has a primary winding connected to the terminal A via the circuit breaker 2, and converts the voltage of the AC power supply 1 to a low voltage detectable by the UV detector 12 when the AC power supply voltage is high.

The UV detector 12 is connected to a secondary winding of the transformer 11, detects the voltage drop of the AC power supply 1, and outputs a voltage drop detection signal P2 (hereinafter, referred to as an UV detection signal P2) to the converter control unit 58 and the inverter control unit 59. Here, when the voltage of the input three-phase alternating current falls below 75% of the rating, the UV detector 12 instantaneously detects a voltage drop and outputs the UV detection signal P2 (for example, H level). When the voltage of the three-phase alternating current becomes 90% or more of the rating, it is determined that the power has been restored, and the UV detection signal P2 is not outputted (for example, L level). That is, the UV detector 12 includes, for example, a hysteresis comparator. The filter unit 20 is connected to the terminal A via the circuit breaker 3.

The filter unit 20 includes reactors 21 and 22 and a capacitor 23, and it reduces harmonic components generated by the converter 50 and surge voltage generated when the circuit breaker 3 is opened or closed.

Circuit breaker 3 is connected to one terminal of the reactor 21 (terminal on circuit breaker 3 side), and the other terminal of the reactor 21 (terminal on capacitor 23 side) is connected to one terminal of capacitor 23 and reactor 22 (terminal on reactor 21 side). The other terminal of the capacitor 23 is grounded or connected to a neutral point of the three-phase alternating current. The other terminal of the reactor 22 (terminal on the electromagnetic switch 30 side) is connected to one terminal of the electromagnetic switch 30 (terminal on the reactor 22 side). The other terminal (terminal on the converter 50 side) of the electromagnetic switch 30 is connected to the AC input of the converter 50 via the input current detector 40.

When the input current of the electromagnetic switch 30 becomes an overcurrent and a circuit connected after the converter 50 and the motor 90 need to be protected, the contacts of the electromagnetic switch 30 are automatically opened.

The input current detector 40 detects the input current inputted to the converter 50 and outputs the signal to the converter control unit 58.

The converter 50 converts the AC power into the DC power. The converted DC power is smoothed by a smoothing capacitor 51. The DC power smoothed by the smoothing capacitor 51 is supplied to the inverter 60. That is, the converter 50 and the inverter 60 are connected via a DC circuit.

The inverter 60 generates and outputs a variable frequency AC voltage (here, a three-phase AC voltage) for driving the motor 90 from the DC power outputted from the converter 50. The AC output of the inverter 60 is outputted to the terminal B of the motor drive apparatus 100 via the output current detector 70 and the electromagnetic switch 80. The motor 90 is connected to the terminal B of the motor drive apparatus 100.

The output current detector 70 detects the output current outputted from the inverter 60. The output current feedback signal of the inverter 60 (hereinafter, referred to as output current feedback Ifbk) detected by the output current detector 70 is inputted to a conversion circuit 67 in the inverter control unit 59. The conversion circuit 67 is, for example, a circuit that outputs a torque current component of the output current feedback Ifbk. For example, the conversion circuit 67 is a d-q conversion circuit that converts a three-phase signal into a two-axis component signal that is orthogonal to each other. The output of the conversion circuit 67 is inputted to a minus terminal of a subtraction circuit 64.

A DC voltage detector 52 for detecting the DC voltage (that is, the voltage of the DC circuit) is connected to the smoothing capacitor 51.

The output of the DC voltage detector 52 is inputted to the converter control unit 58 and the inverter control unit 59. During normal operation, the converter control unit 58 outputs gate pulses to control switching devices constituting the converter 50 using DC voltage feedback signal (hereinafter referred to as DC voltage feedback VDCfbk) which is an output signal of the DC voltage detector 52 and an input current feedback signal which is an output signal of the input current detector 40, so that the DC voltage of the smoothing capacitor 51 (hereinafter simply referred to as DC voltage) is maintained at a constant value (hereinafter referred to as rated DC voltage). The converter 50 is controlled based on the gate pulses inputted from converter control unit 58. Further, when receiving the UV detection signal P2 from the UV detector 12, the converter control unit 58 performs a protection operation as necessary.

A speed sensor (rotation speed detection means) 91 physically connected to a shaft of the motor 90 detects the rotation speed of the motor 90 and outputs a rotation speed feedback signal (hereinafter referred to as speed feedback ωfbk). The speed feedback ωfbk outputted from the speed sensor 91 is inputted to the inverter control unit 59 via the terminal C of the motor drive apparatus 100. Further, a signal (hereinafter, referred to as an external speed command) for instructing the rotation speed of the motor 90 is inputted from an external device (not shown) to the inverter control unit 59 via the terminal D of the motor drive apparatus 100. Here, the external speed command and the speed feedback ωfbk have a positive value when the motor 90 rotates in the hoisting direction, and a negative value when the motor 90 rotates in the lowering direction.

The following is a description of the inside of the inverter control unit 59. The speed reference setting unit 61 in the inverter control unit 59 receives the external speed command from outside, a DC voltage feedback VDCfbk which is the output signal of the DC voltage detector 52, and the UV detection signal P2 which is the output of the UV detector 12. Then, the internal speed command is outputted to a subtraction circuit 62. The internal configuration of the speed reference setting unit 61 will be described later.

The speed feedback ωfbk is inputted to a minus terminal of the subtraction circuit 62 in the inverter control unit 59. The internal speed command outputted from the speed reference setting unit 61 is inputted to a plus terminal of the subtraction circuit 62.

The subtraction circuit 62 subtracts the speed feedback ωfbk from the internal speed command, and inputs the resulting speed deviation to a speed control unit (ASPR: Automatic Speed Regulator) 63.

The speed control unit 63 outputs the torque current reference so that the speed deviation inputted from the subtraction circuit 62 is minimized, and the torque current reference is inputted to a plus terminal of a subtraction circuit 64.

The subtraction circuit 64 inputs a deviation current signal between the torque current reference and the torque current component of the output current feedback Ifbk outputted from the conversion circuit 67 to a current control unit (ACR: Automatic Current Regulator) (current control means) 65.

The current control unit 65 generates a voltage command signal that is an output so that the current deviation signal inputted from the subtraction circuit 64 is minimized, and inputs the voltage command signal to a PWM controller 66.

The PWM controller 66 generates and outputs gate pulses for controlling switching elements included in the inverter 60 based on the voltage command signal inputted from the current control unit 65, and outputs the gate pulses outputted from the PWM controller 66 to the inverter 60. The inverter 60 is controlled based on the gate pulses inputted from the PWM controller 66, and outputs an AC voltage for driving the motor 90. That is, the output of the inverter 60 is controlled so that the rotation speed of the motor 90 follows the internal speed command.

Figure 2:
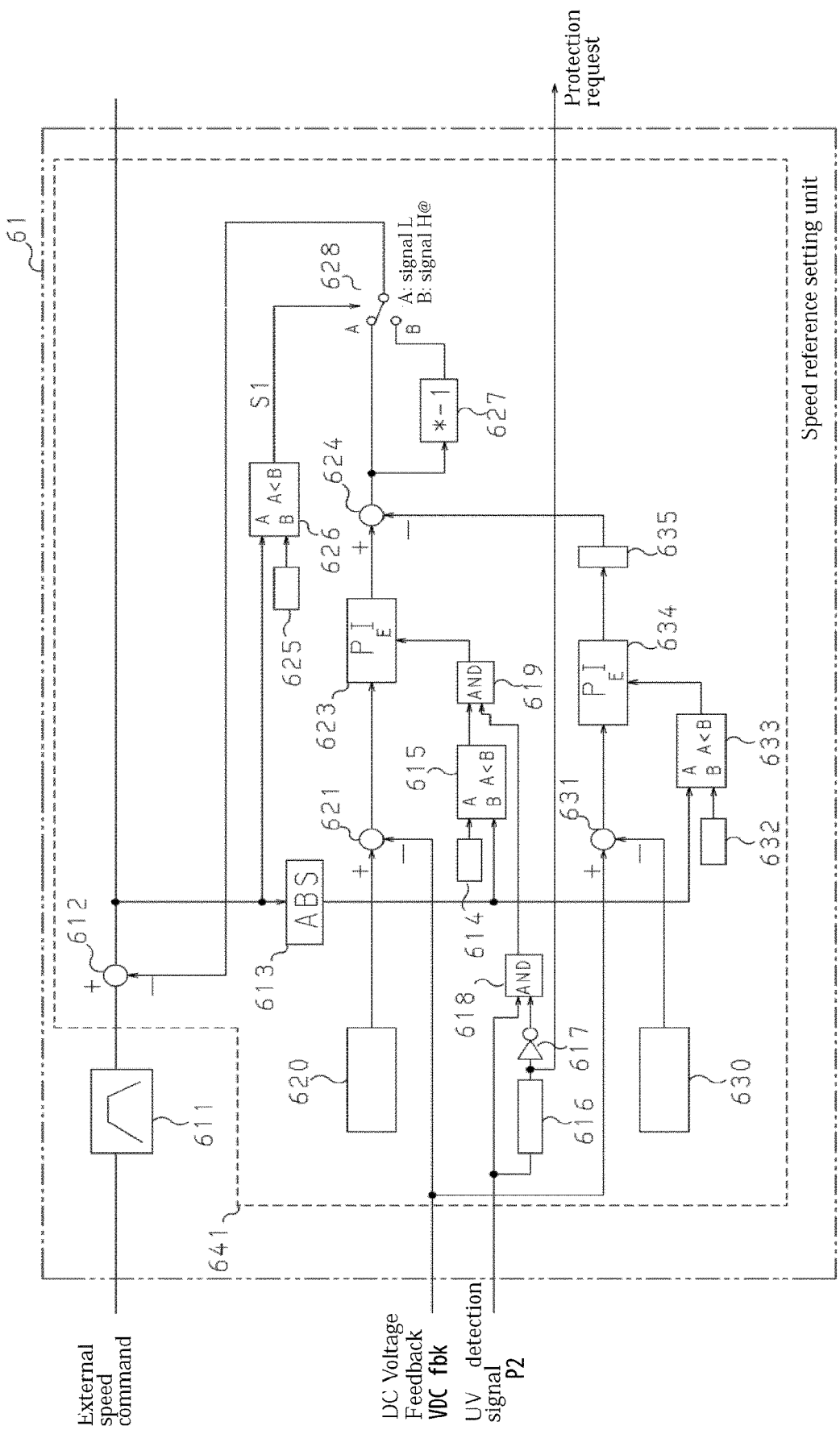
FIG. 2 is a schematic configuration diagram of a speed reference setting unit included in the motor drive apparatus according to the first embodiment.

FIG. 2 is a block diagram showing an example of the internal configuration of the speed reference setting unit 61. Hereinafter, the speed reference setting unit 61 will be described with reference to FIGS. 2 and 1. The speed reference setting unit 61 includes a rate generation circuit 611 and a correction circuit 641.

The external speed command is inputted to the rate generation circuit 611, and the output of the rate generation circuit 611 is inputted to a plus terminal of the subtraction circuit 612 in a correction circuit 641.

The rate generation circuit 611 sets the rate of change of the signal outputted by the rate generation circuit 611 to a less rate than predetermined rate, for example, even when the external speed command changes abruptly in steps. An operation of suppressing a change rate in the rate generation circuit 611 finally performs to suppress a steep torque fluctuation to the motor 90.

The speed command correction value outputted from the switching circuit 628 in the correction circuit 641 is inputted to a minus terminal of the subtraction circuit 612. The output of the subtraction circuit 612 is inputted to an absolute value circuit 613 in the correction circuit 641 and an A terminal of a comparison circuit 626 in the correction circuit 641. Further, the output of the subtraction circuit 612 is outputted from the speed reference setting unit 61 as an internal speed command, and is inputted to the subtraction circuit 62. That is, the external speed command inputted from the outside passes through the rate generating circuit 611, the speed command correction value is subtracted by the subtraction circuit 612 in the correction circuit 641, and is outputted as an internal speed command.

A method for generating the speed command correction value will be described below. The UV detection signal P2 outputted from the instantaneous voltage drop detection unit 10 is inputted to a first terminal of an AND circuit 618 and an on-delay 616 in the correction circuit 641.

The on-delay 616 is a circuit whose output changes from L level to H level after a predetermined delay time when the input signal changes from L level to H level. The on-delay 616 is a circuit that instantaneously changes its output from H level to L level when the input signal changes from H level to L level. In the present embodiment, for example, the delay time of the on-delay 616 is set to the instantaneous voltage drop allowable time Ta of the motor drive apparatus 100.

The output of the ON delay 616 is inputted to an inverting circuit 617 in the correction circuit 641 and is outputted to the outside of the speed reference setting unit 61 as a protection request signal. When the voltage drop of the AC power supply 1 continues for the instantaneous voltage drop allowable time Ta of the motor drive apparatus 100, the output of the ON delay 616 becomes H level.

The protection request signal is inputted to, for example, the PWM control unit 66, and when the voltage drop of the AC power supply 1 continues beyond the voltage drop allowable time Ta of the motor drive apparatus 100, the inverter 60 instructs the protection request operation of the gate block or the like. For example, the drop allowable time Ta is an example of a first set time. For example, the drop allowable time Ta is 0.6 seconds.

The output of the inversion circuit 617 is inputted to a second terminal of an AND circuit 618. The inversion circuit 617 is a circuit that outputs a logic level opposite to that of the input signal.

The AND circuit 618 is a circuit that outputs the logical product of the first terminal input and the second terminal input. Therefore, the output of the AND circuit 618 goes to H level immediately after the UV detection signal P2 goes from L level to H level, the UV detection signal P2 continues to be at H level, and the duration of the H level is the time of the ON delay 616. After the instantaneous drop allowable time Ta, which is the delay setting time, the output of the AND circuit 618 becomes L level. On the condition that the duration of the H level of the UV detection signal P2 is shorter than the delay set time of the ON delay 616, when the UV detection signal P2 changes from the H level to the L level, the output of the AND circuit 618 immediately changes to the L level.

The output of the AND circuit 618 is inputted to the second terminal of the AND circuit 619 in the correction circuit 641. The output of the absolute value circuit 613 is inputted to a B terminal of a comparator 615 and the A terminal of a comparator 633 in the correction circuit 641.

The value set by the setting circuit 614 is inputted to an A terminal of the comparator 615. Here, the set value of the setting circuit 614 is, for example, a value of 10% of the rated rotation speed of the motor 90. The comparator 615 is a comparison circuit that sets the output of the comparator 615 to the H level when the value of the terminal A is smaller than the value of the terminal B. Therefore, in the present embodiment, for example, when the absolute value of the internal speed command is larger than 10% of the rated rotation speed of the motor 90, the output of the comparator 615 becomes H level. The output of the comparator 615 is inputted to the AND circuit 619. An output of the AND circuit 619 is connected to an enable terminal of a first correction control circuit 623 (hereinafter, the enable terminal is referred to as an E terminal).

The output of the setting circuit 620 is inputted to a plus terminal of a subtraction circuit 621 in the correction circuit 641, and the DC voltage feedback VDCfbk, which is the output signal of the DC voltage detector 52, is inputted to a minus terminal of the subtraction circuit 621. The set value of the setting circuit 620 is, for example, a rated DC voltage. The setting value of the setting circuit 620 is one of the example of a first reference value.

The subtraction circuit 621 outputs a deviation between the output of setting circuit 620 and the DC voltage feedback VDCfbk to an input terminal of a first correction control circuit 623 in the correction circuit 641.

The first correction control circuit 623 is a circuit having an integration element with the enable E terminal, and for example, when the H level is inputted to the E terminal, it controls the deviation given to the input terminal to approach the minimum, and outputs a signal to the plus terminal of the subtraction circuit 624 in the correction circuit 641, and when the E terminal input becomes L level, the output signal becomes near zero. When the first correction control circuit 623 is a circuit having an integration element such as a proportional integration circuit, it is desirable that the integration element is reset while the terminal E is at the L level, and the output of the first correction control circuit 623 becomes close to zero. This is because by making a configuration that the integration element is reset while the E terminal is at the L level, when the E terminal changes from the L level to the H level, the output of the first correction control circuit 623 can continuously changes from near zero.

The value set by the setting circuit 632 is inputted to the B terminal of the comparator 633. Here, the setting value of the setting circuit 632 is, for example, a value of 110% of the rated rotation speed of the motor 90.

The comparator 633 is a comparison circuit that sets the output of the comparator 633 to H level when the value of the A terminal is smaller than the value of the B terminal. Therefore, in the present embodiment, for example, when the absolute value of the internal speed command is 110% or less of the rated rotation speed of the motor 90, the output of the comparator 633 becomes H level.

The output of the comparator 633 is connected to the E terminal of the second correction control circuit 634 in the correction circuit 641. The output of the setting circuit 630 is inputted to a minus terminal of a subtraction circuit 631 in the correction circuit 641, and the DC voltage feedback VDCfbk, which is the output signal of the DC voltage detector 52, is inputted to the plus terminal of the subtraction circuit 631. The set value of the setting circuit 630 is, for example, a value of 110% of the rated DC voltage. The setting value of the setting circuit 630 is one of the second reference value.

The subtraction circuit 631 outputs the deviation between the setting circuit 630 and the DC voltage feedback VDCfbk to a second correction control circuit 634.

The second correction control circuit 634 is a circuit having an integration element with the enable E terminal, and for example, when an H level is inputted to the E terminal, it controls the deviation given to the input terminal to be a minimum and sends a signal to a limiter circuit 635 in the correction circuit 641, and when the output and the E terminal input become L level, the output becomes near zero. On the condition that the second correction control circuit 634 is a circuit having an integration element such as a proportional integration circuit, it is desirable that the integration element is reset while the terminal E is at L level, and the output of the second correction control circuit 634 is close to zero. This is because by making the configuration that the integration element is reset while the E terminal is at the L level when the E terminal changes from the L level to the H level, the output of the second correction control circuit 634 can continuously changes from near zero.

The limiter 635 is a lower limiter, for example, the lower limit is set to zero. By setting the lower limit value of the limiter 365 to zero, the second correction control circuit 634 outputs a non-zero positive output when the internal speed command is less than 110% of the rated rotation speed of the motor 90 and the DC voltage feedback VDCfbk exceeds, for example, 110% of the rated DC voltage. Otherwise, the output of the limiter 635 becomes zero.

Here, the output of the limiter 635 is enabled only when the output of the second correction control circuit 634 is positive. That is, the circuit is configured to be effective only when the DC voltage feedback VDCfbk becomes equal to or more than the value set by the setting circuit 630. The output of the limiter 635 is inputted to the minus terminal of a subtraction circuit 624.

The subtraction circuit 624 outputs the difference between the output of the first correction control circuit 623 and the output of the limiter 635. The output of the subtraction circuit 624 is inputted to an A terminal of a switching circuit 628 and a polarity inversion circuit 627 in the correction circuit 641.

The polarity inversion circuit 627 is a circuit that multiplies the input value by −1 and outputs the result. The output of the polarity inversion circuit 627 is inputted to the B terminal of the switching circuit 628.

A switching signal S1 outputted from a comparator 626 is inputted to the control signal terminal of the switching circuit 628.

The value set by a setting circuit 625 is inputted to a B terminal of the comparator 626. Here, the set value of the setting circuit 625 is zero. The comparator 626 is a comparison circuit that sets the output of the comparator 626 to an H level when the value of the A terminal is smaller than the value of the B terminal. Therefore, in this embodiment, for example, when the internal speed command is a value for rotating the motor 90 in the hoisting direction, the switching signal S1 outputted from the comparator 626 becomes L level, and when the internal speed command is a value for rotating the motor 90 in the lowering direction, the switching signal S1 becomes H level. An output of the comparator 626 is connected to a control signal terminal of a switching circuit 628.

The switching circuit 628 is a switching circuit that outputs the signal connected to the A terminal when the input signal level of the control signal terminal is L level, and outputs the signal connected to the B terminal when the input signal level of the control signal terminal is H level. Therefore, in this embodiment, when the internal speed command is a value for rotating the motor 90 in the hoisting direction, the switching circuit 628 outputs the output signal of the subtraction circuit 624, and when the internal speed command is a value for rotating the motor 90 in the lowering direction, the switching circuit 628 outputs the output signal of the polarity inversion circuit 627.

That is, the first correction control circuit 623 constitutes a circuit that outputs a speed correction signal so that the DC voltage feedback VDCFBK is maintained at the set value (for example, rated voltage) of the setting circuit 620 when the voltage drop of the AC power supply 1 occurs. And, the comparator 615 and the AND circuit 619 constitutes a circuit that stop outputting the speed correction signal, when the speed (absolute value) of the motor is less than a predetermined value (for example, 10%) determined by the setting circuit 614.

In addition, the second correction control circuit 634 constitutes a circuit that outputs a speed correction signal so that the DC voltage feedback VDCFBK is maintained at or below the set value (for example, 110% of the rated voltage) of the setting circuit 630 when the DC voltage feedback VDCFBK increases. And the comparator 633 constitutes a circuit that stops the output of the speed correction signal, when the speed (absolute value) of the motor exceeds a predetermined value (for example, 110% of the rated rotation speed) determined by the setting circuit 614.

The output of the switching circuit 628 is inputted to the minus terminal of the subtraction circuit 612 as a speed command correction value. That is, the switching circuit 628 is a circuit that switches the polarity of the speed command correction value that is the output of the first correction control circuit 623 or the output of the second correction control circuit 634 via the limiter circuit 635, according to the rotation direction of the motor.

The correction circuit 641 is configured to output the internal speed command by comparing the DC voltage feedback VDCfbk with the set value of the setting circuit 620, and correcting the external speed command so that the difference approaches zero, when a voltage drop occurs in the AC power supply 1.

When the voltage drop of the AC power supply 1 occurs, the correction circuit 641 corrects the internal speed command as an absolute value in a direction in which the internal speed command increases when the DC voltage feedback VDCfbk is higher than the set value of the setting circuit 620, and corrects the internal speed command as an absolute value in a direction in which the internal speed command increases when VDCfbk is lower than the setting value of the setting circuit 620.

The correction circuit 641 compares the DC voltage feedback VDCfbk with the set voltage of the setting circuit 630, and when the DC voltage feedback VDCfbk exceeds the setting circuit 630, correct the internal speed command as an absolute value to be increased so that the difference approaches zero.

In a device such as a crane, whether the motor drive apparatus 100 performs a power running operation or a regenerative operation is determined by the relationship between the load and the counterweight. So the power running operation and the regenerative operation can be performed in both the hoisting and lowering directions. Therefore, the operation of the motor drive apparatus 100 according to the first embodiment when the voltage of the AC power supply 1 decreases during the power running operation and the regenerative operation in both the hoisting and lowering directions will be described.

Figure 3:
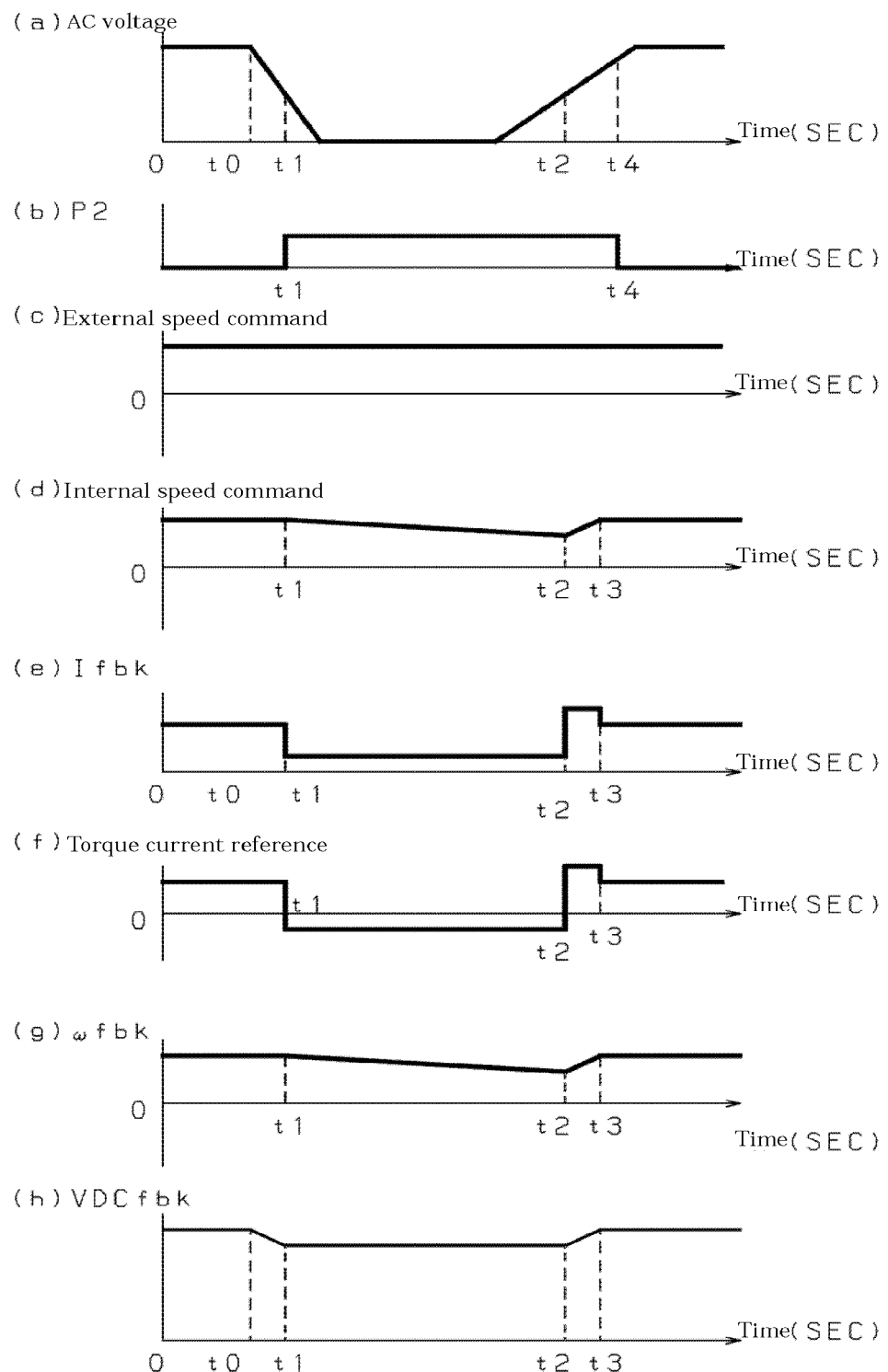
FIG. 3 is a diagram illustrating an operation of the motor drive apparatus according to the first embodiment during hoisting and power running.

FIG. 3 is a time chart illustrating the operation of each part of the motor drive apparatus 100 when a voltage drop occurs in the AC power supply 1 during the hoisting and power running operations of the motor drive apparatus according to the first embodiment, and thereafter the power is restored. The waveforms shown in (a) to (e) in FIG. 3 correspond to the waveforms of the parts (a) to (e) in FIG. 1. Hereinafter, an example of the operation of the motor drive apparatus 100 according to the first embodiment when the voltage of the AC power supply 1 decreases during the hoisting and power running operations will be described with reference to FIGS. 1, 2, and 3.

FIG. 3 (a) is an example of a change in the effective value of the voltage of the AC power supply 1 (hereinafter, referred to as AC voltage). In this example, the AC voltage starts to decrease at time t0, becomes 75% or less of the rated voltage at which the UV detector 12 operates at time t1, and then starts to recover. At time t2, the converter 50 can perform the converter operation. This shows a state in which the voltage has recovered to 90% of the rated voltage at which the UV detector 12 recovers at time t4. Here, the period from time t1 to time t2 is shorter than the delay set time Ta of the ON delay 616.

FIG. 3 (b) shows the operation of the UV detection signal P2 outputted from the UV detector 12. The AC voltage became less than 75% of the rated voltage at time t1 and recovered to 90% of the rated voltage at time t2. The signal P2 becomes H level from L level at time t1, and becomes L level at time t4.

FIG. 3 (c) shows an external speed command. In the present embodiment, a case is shown in which the external speed command given from the outside has a constant value in order to continue the operation of the motor 90 even when the voltage drop of the AC power supply 1 is detected.

FIG. 3 (d) shows an internal speed command. Before time t1, the external speed command and the internal speed command have the same value. The internal speed command decreases after time t1 when the UV detection signal P2 becomes H level, starts increasing after time t2, and becomes equal to the external speed command again at time t3.

FIG. 3 (e) shows the output current feedback Ifbk. It is constant before time t1, but decreases after t1, turns to increase after time t2, and becomes constant again at time t3.

FIG. 3 (f) shows the torque current. Before the time t1, since the power running operation is performed, a positive value is indicated. Since the regenerative operation is performed after the time t1 because the internal speed command is reduced, the torque current reference indicates a negative value. After the time t2, since the power running operation is performed, the torque current reference becomes a positive value.

FIG. 3 (g) shows the speed feedback ωfbk. The operation follows the internal speed command.

FIG. 3 (H) shows a DC voltage feedback VDCfbk. The voltage drops after time t0 when the voltage drop of the AC power supply 1 occurs, the drop is suppressed after time t1, and starts to increase after time t2 by voltage recovering of the AC power supply 1, and becomes equal to the initial value at time t3.

The operation will be described below. In the initial condition of FIG. 3, since the hoisting operation is being performed, the internal speed command outputted from the subtraction circuit 612 is a positive value. Therefore, the output of the comparator 626 is at L level, and the input terminal A of the switching circuit 628, that is, the output of the subtraction circuit 624 is selected.

When the UV detection signal P2 shown in FIG. 3 (b) is outputted at time t1 during the hoisting operation and the power running operation, the output of the AND circuit 618 in the speed reference setting unit 61 becomes H level. Here, if the absolute value of the internal speed command is, for example, 10% or more, the output of the AND circuit 619 also becomes H level, and the first correction control circuit 623 becomes operable.

The first correction control circuit 623 outputs a signal so that the difference between the setting value of the setting circuit 620 and the DC voltage feedback VDCfbk is minimized. In this case, since the DC voltage feedback VDCfbk is lower than the value of the setting circuit 630, the output of the subtraction circuit 631 is a negative value. Accordingly, the output of the second correction control circuit 634 is also a negative value, but the output of the limiter circuit 635 becomes zero by the limiter circuit 635. Accordingly, a value equal to the output value of the first correction control circuit 623 is inputted to the minus terminal of the subtraction circuit 612.

Then, if a voltage drop of the AC power supply 1 occurs during the power running operation, the converter 50 cannot supply power to the DC circuit, so that the voltage of the DC circuit decreases from time t0, and the DC voltage feedback VDCfbk also decrease as shown in FIG. (h). Therefore, the output of the subtraction circuit 621 takes a positive value.

When the enable terminal input of the first correction control circuit 623 becomes H level at the time t1, the first correction control circuit 623 outputs a positive value so that the output of the positive subtraction circuit 621 approaches zero. As a result, the internal speed command outputted from the subtraction circuit 612 decreases.

Since the internal speed command is reduced at time t1 and rotation speed of the motor 90 is reduced, the torque current reference shown in FIG. 3 (f) takes a negative value indicating regeneration, for example, from a positive value indicating power running. Also, the output current feedback Ifbk detected by the output current detector 70 shown in FIG. 3 (e) has a small value from time t1. The movement of speed feedback ωfbk shown in FIG. 3 (g) follows to the internal speed command shown in FIG. 3 (d). The DC voltage feedback VDCfbk shown in FIG. 3 (h) is suppressed from decreasing as a result of a series of operations after time t1.

When the AC voltage is restored and the converter 50 becomes operable at time t2, the DC voltage increases. Then, since the difference of the subtraction circuit 621 decreases, the output of the first correction control circuit 623 starts to decrease. Therefore, the internal speed command outputted from the subtraction circuit 612 shown in FIG. 3 (d) starts to increase. Further, the torque current reference shown in FIG. 3 (f) changes to power running to increase the motor speed. Further, as shown in FIGS. 3 (d), 3 (f), and 3 (h), when the DC voltage becomes equal to the rated voltage at time t3, the internal speed command also has the same value as the external speed command, and the torque command also takes the value before the voltage drop.

When the AC voltage returns to a predetermined value at time t4 as shown in FIG. 3 (a), the UV detection signal becomes L level as shown in FIG. 3 (b).

As described above, the motor drive apparatus according to the first embodiment can continue operation without stopping even if an instantaneous voltage drop occurs during the hoisting and power running operation.

Figure 4:
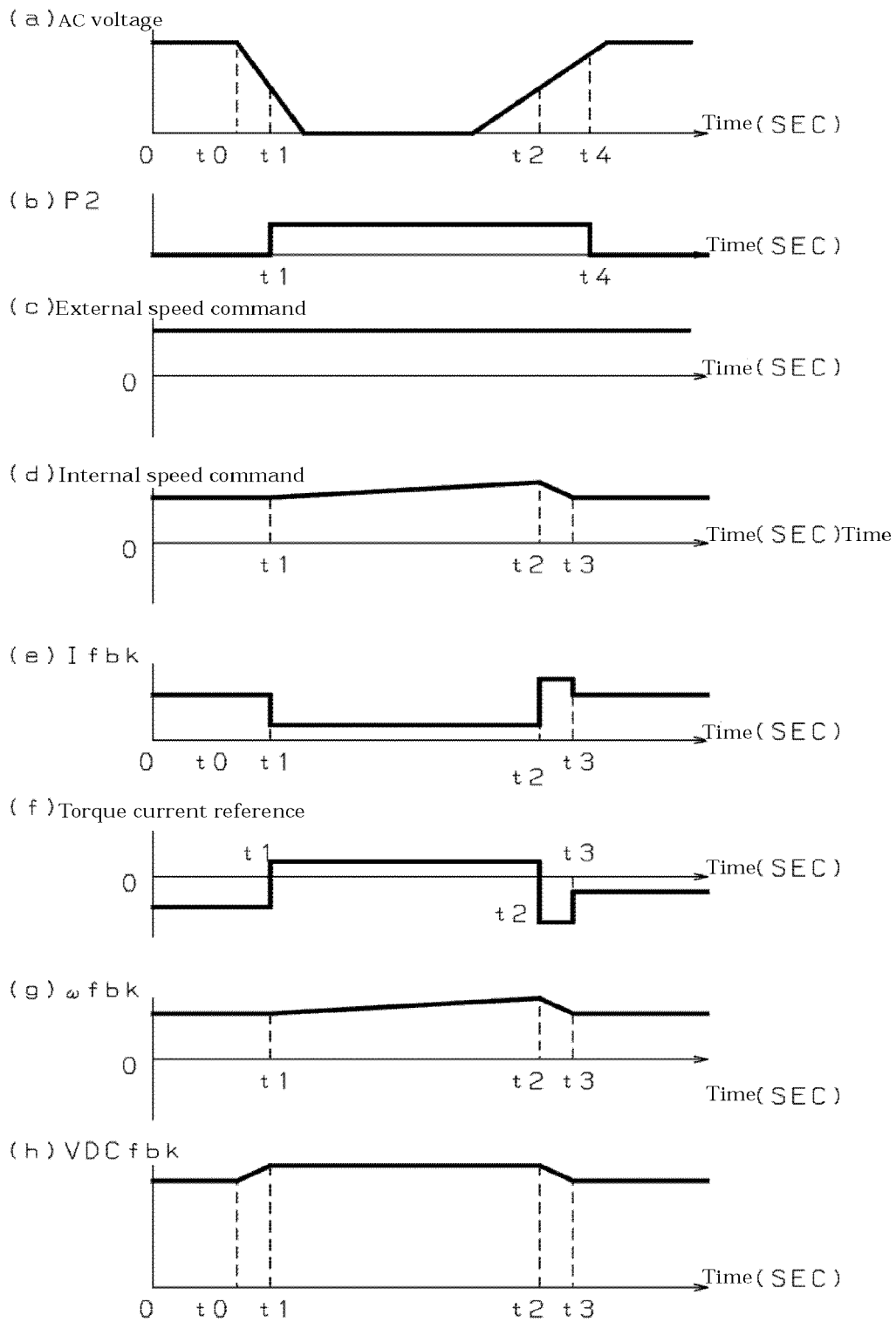
FIG. 4 is a diagram illustrating an operation of the motor drive apparatus according to the first embodiment during hoisting and regeneration.

FIG. 4 is a time chart for explaining the operation of each part of the motor drive apparatus 100 when a voltage drop occurs in the AC power supply 1 during the hoisting and regeneration operations of the motor drive apparatus according to the first embodiment, and thereafter the power is restored. The waveforms shown in (a) to (e) of FIG. 4 correspond to the waveforms of the portions (a) to (e) in FIG. 1 as these in FIG. 3). Hereinafter, an example of an operation of the motor drive apparatus 100 according to the first embodiment when a voltage drop occurs during a hoisting and a regenerating operation will be described with reference to FIGS. 1, 2, and 4.

FIG. 4 (a) is an example of a change in the effective value of the voltage of the AC power supply 1 (hereinafter, referred to as AC voltage) as in FIG. 3. Since the change of the AC voltage is the same as that shown in FIG. 3, description thereof will be omitted.

FIG. 4 (b) shows the operation of the UV detection signal P2 outputted from the UV detector 12, as in FIG. 3 (b). Since the operation is the same as that shown in FIG. 3 (b), description thereof will be omitted.

FIG. 4 (c) shows an external speed command. This embodiment shows a case where the external speed command given from the outside is a constant value in order to continue the operation of the motor 90 even when the voltage drop of the AC power supply 1 is detected.

FIG. 4 (d) shows an internal speed command. Before time t1, the external speed command and the internal speed command have the same value. The internal speed command rises after time t1 at which the UV detection signal P2 becomes H level, and after time t2, it starts to fall and rises, and becomes equal to the external speed command again at time t3.

FIG. 4 (e) shows the output current feedback Ifbk. It is constant before time t1, but decreases after t1, turns to increase after time t2, and becomes constant again at time t3.

FIG. 4 (f) shows a torque current reference. Since the regeneration operation is performed before time t1, a negative value is shown. After time t1, since the internal speed command is increased, the power running operation is performed, and the torque current reference indicates a positive value. After time t2, since the regenerative operation is performed, the reference value becomes a negative value.

FIG. 4 (g) shows the speed feedback ωfbk. The operation follows the internal speed command.

FIG. 4 (h) shows a DC voltage feedback VDCfbk. The feedback voltage rises after time t0 when the voltage drop occurs, the rise is suppressed after time t1. When the AC power supply 1 recovers, the voltage drops after the time t2, and becomes equal to the initial value at time t3.

In the initial condition of FIG. 4, since the hoisting operation is being performed, the internal speed command outputted from the subtraction circuit 612 is a positive value. Therefore, the output of the comparator 626 is at L level, and the input terminal A of the switching circuit 628, that is, the output of the subtraction circuit 624 is selected.

During the hoisting and regeneration operations, when the UV detection signal P2 shown in FIG. 3 (b) is outputted at time t1, the output of the AND circuit 618 in the speed reference setting unit 61 becomes H level. Here, if the absolute value of the internal speed command is, for example, 10% of the rated motor speed or more, the output of the AND circuit 619 also becomes H level, and the first correction control circuit 623 becomes operable. The first correction control circuit 623 outputs a signal so that the difference between the set value of the setting circuit 620 and the DC voltage feedback VDCfbk is minimized.

In this case, since the DC voltage feedback VDCfbk is lower than the value of the setting circuit 630, the output of the subtraction circuit 631 is a negative value. Therefore, the output of the second correction control circuit 634 is also a negative value, but the output of the limiter circuit 635 becomes zero by its limit function. Accordingly, a value equal to the output value of the first correction control circuit 623 is inputted to the minus terminal of the subtraction circuit 612. Here, if a voltage drop of the AC power supply 1 occurs during the regenerative operation, since the converter 50 cannot regenerate power from the DC circuit to the AC power supply 1, the voltage of the DC circuit increases from time t0 as shown in FIG. 3 (h). The DC voltage feedback VDCfbk also increases. Therefore, the output of the subtraction circuit 621 takes a negative value.

When the enable terminal input of the first correction control circuit 623 becomes H level at time t1, the first correction control circuit 623 outputs a negative value so that the output of the negative subtraction circuit 621 approaches zero. As a result, the internal speed command outputted from the subtraction circuit 612 increases. Since the internal speed command of the motor 90 increases at time t1, the torque current reference shown in FIG. 3 (f) changed to take a positive value indicating power running for example, from negative value indicating regeneration. Also, the output current feedback Ifbk detected by the output current detector 70 shown in FIG. 3 (e) has a small value from time t1. The speed feedback ωfbk shown in FIG. 4 (g) shows the movement to follow the internal speed command shown in FIG. 4 (d). The DC voltage feedback VDCfbk shown in FIG. 4 (h) is suppressed from rising as a result of a series of operations after time t1.

When the AC voltage returns to a level at which converter 50 can operate at time t2, the DC voltage decreases. Then, since the difference of the subtraction circuit 621 decreases, the absolute value of the output of the first correction control circuit 623 starts to decrease. Accordingly, the internal speed command outputted from the subtraction circuit 612 shown in FIG. 4 (d) starts to decrease. In addition, the torque current reference shown in FIG. 4 (f) starts to regenerate to reduce the speed. Also, as shown in FIGS. 4 (d), 4 (f), and 4 (h), when the DC voltage becomes equal to the rated voltage at time t3, the internal speed command also has the same value as the external speed command, and the torque command also becomes to be a value before the voltage drop.

As described above, the motor drive apparatus according to the first embodiment can continue operation without stopping even if a voltage drop of the AC power supply 1 occurs during the hoisting and regenerative operation.

Figure 5:
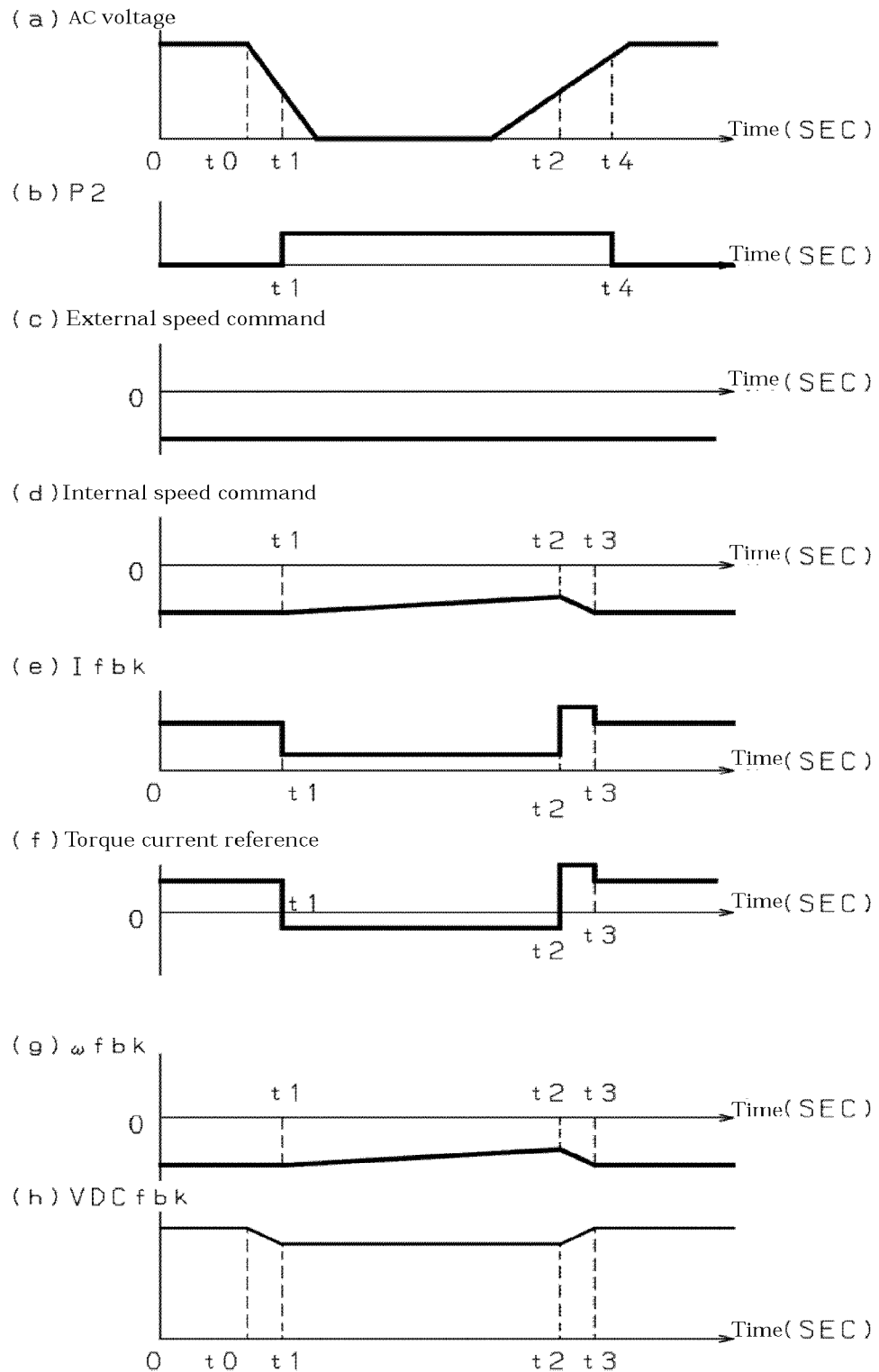
FIG. 5 is a diagram illustrating an operation of the motor drive apparatus according to the first embodiment during lowering and power running.

FIG. 5 is a time chart illustrating the operation of each part of the motor drive apparatus 100 when a voltage drop occurs in the AC power supply 1 during the lowering and power running operations of the motor drive apparatus according to the first embodiment, and thereafter the power is restored. The waveforms shown in (a), (b), and (e) in FIG. 5 correspond to the waveforms of (a), (b), and (e) in FIG. 1 as these of FIG. 3. Hereinafter, an example of the operation of the motor drive apparatus 100 according to the first embodiment when an instantaneous voltage drop occurs during the lowering and power running operations will be described with reference to FIGS. 1, 2, and 5.

FIG. 5 (a) shows an example of a change in the effective value of the voltage of the AC power supply 1 (hereinafter, referred to as an AC voltage) as in FIG. 3 (a). The change of the AC voltage is the same as that shown in FIG. 3 (a).

FIG. 5 (b) shows the operation of the UV detection signal P2 outputted from the UV detector 12, as in FIG. 3 (b). Since the operation is the same as that shown in FIG. 3 (b), explanation thereof will be omitted.

FIG. 5 (c) shows an external speed command. Since the operation is the lowering operation, the external speed command indicates a negative value. This embodiment shows a case where the external speed command given from the outside is a constant value in order to continue the operation of the motor 90 even when the voltage drop of the AC power supply 1 is detected. It is the same as FIG. 3 (c) except that the polarity is inverted.

FIG. 5 (d) shows an internal speed command. Before time t1, the external speed command and the internal speed command have the same negative value. The internal speed command rises (positive direction) after time t1 when the UV detection signal P2 becomes the H level, turns downward (negative direction) after time t2, and becomes equal to the external speed command again at time t3. It is the same as FIG. 3 (d) except that the polarity is inverted.

FIG. 5 (e) shows the output current feedback Ifbk. It is constant before time t1, but decreases after t1, turns to increase after time t2, and becomes constant again at time t3. This is the same as FIG. 3 (d).

FIG. 5 (f) is a torque current reference. Before the time t1, a positive value is shown because the power running operation is performed. After the time t1, since the regenerative operation is performed and the absolute value of the internal speed command decreases, the torque current reference indicates a negative value. After the time t2, the torque current reference becomes positive by the power running operation, and the initial value is returned at the time t3. This is the same as FIG. 3 (f).

FIG. 5 (g) shows the speed feedback ωfbk. The operation follows the internal speed command. It is the same as FIG. 3 (g) except that the polarity is inverted.

FIG. 5 (h) shows the DC voltage feedback VDCfbk. After the time t0 when the voltage drop of the AC power supply 1 occurs, the voltage drops, the drop is suppressed after the time t1, and when the AC power supply 1 recovers, the voltage rises after the time t2 and becomes equal to the initial value at the time t3. This is the same as FIG. 3 (d).

Under the initial condition of FIG. 5, the internal speed command outputted from the subtraction circuit 612 is a negative value because the motor is in the lowering and power running operation. Therefore, the output of the comparator 626 is at H level, and the switching circuit 628 selects the input terminal B, that is, the output of the polarity inversion circuit 627. Namely, a value obtained by inverting the polarity of the output of the subtraction circuit 624 is inputted to the minus terminal input of the subtraction circuit 612 as a speed correction value.

Since the subsequent operation is the same as the description of FIG. 3 except that the polarities of the external speed command and the internal speed command are reversed, description thereof will be omitted.

As described above, the motor drive apparatus according to the first embodiment can continue operation without stopping even if the voltage of the AC power supply 1 decreases during the power running and lowering operation.

Figure 6:
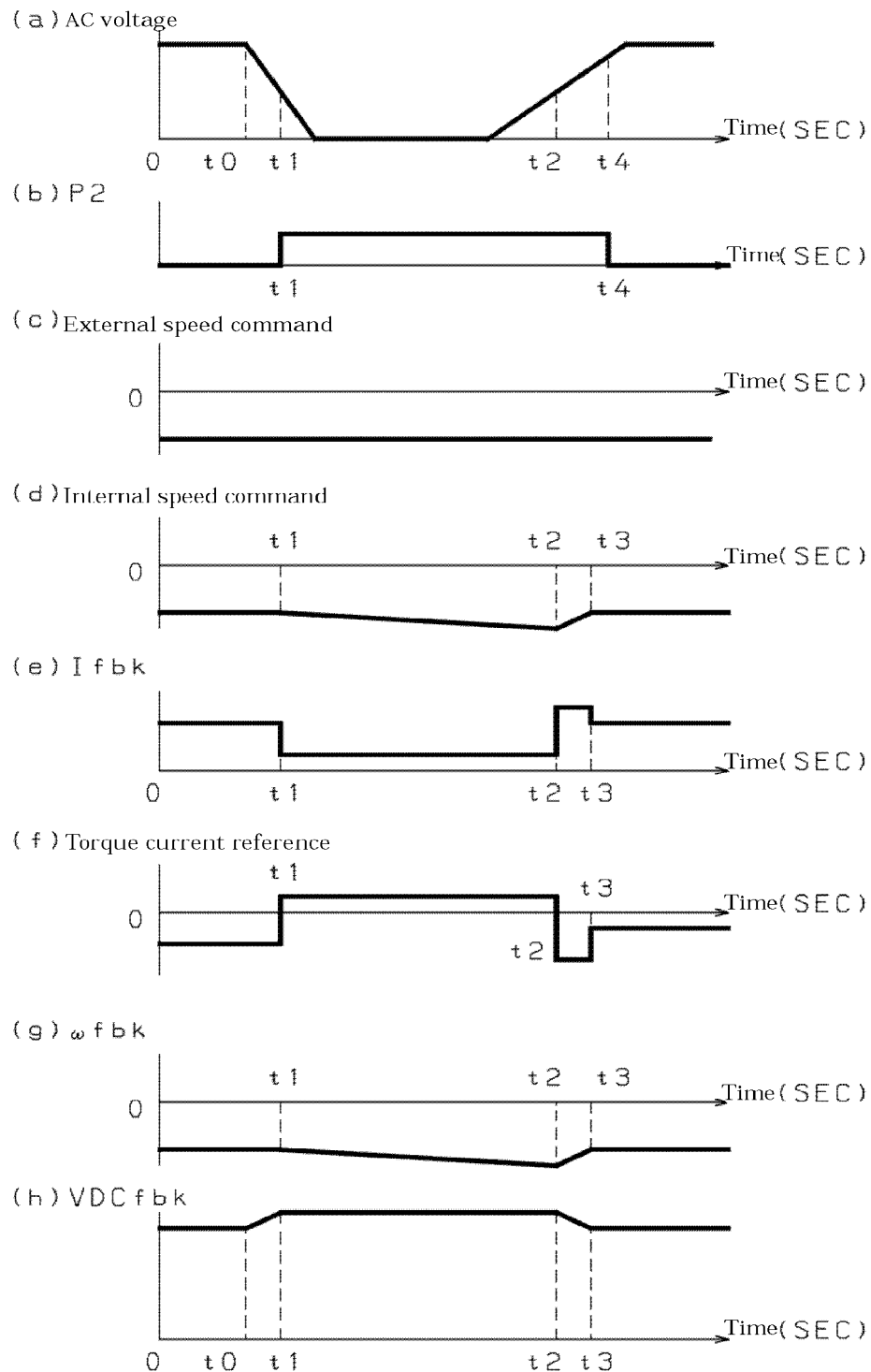
FIG. 6 is a diagram illustrating an operation of the motor drive apparatus according to the first embodiment during lowering and regeneration.

FIG. 6 is a time chart illustrating the operation of each unit of the motor drive apparatus 100 when a voltage drop occurs in the AC power supply 1 during the lowering and regenerating operations of the motor drive apparatus according to the first embodiment, and thereafter the power is restored. The waveforms shown in (a), (b), and (e) in FIG. 5 correspond to the waveforms of (a), (b), and (e) in FIG. 1 as FIG. 3. Hereinafter, an example of the operation of the motor drive apparatus 100 according to the first embodiment when the voltage of the AC power supply 1 decreases during the lowering and regeneration operations will be described with reference to FIGS. 1, 2, and 6.

FIG. 6 (a) is an example of a change in the effective value of the voltage of the AC power supply 1 (hereinafter, referred to as AC voltage) as in FIG. 3 (a). Since the change of the AC voltage is the same as that shown in FIG. 3 (a), explanation thereof will be omitted.

FIG. 6 (b) shows the operation of the UV detection signal P2 outputted from the UV detector 12, as in FIG. 3 (b). Since the operation is the same as that shown in FIG. 3 (b), explanation thereof will be omitted.

FIG. 6 (c) shows an external speed command. Since the operation is the lowering operation, the external speed command indicates a negative value. This embodiment shows a case where the external speed command given from the outside is a constant value in order to continue the operation of the motor 90 even when the voltage drop of the AC power supply 1 is detected.

FIG. 6 (d) shows an internal speed command. Before time t1, the external speed command and the internal speed command have the same negative value. The internal speed command falls (negative direction) after time t1 at which the UV detection signal P2 becomes H level, changes to rise (positive direction) after time t2, and becomes equal to the external speed command again at time t3.

FIG. 6 (e) shows the output current feedback Ifbk. It is constant before time t1, but decreases after t1, turns to increase after time t2, and becomes constant again at time t3.

FIG. 6 (f) shows the torque current. Since the regeneration operation is performed before time t1, it takes a negative value. After time t1, since the absolute value of the internal speed command increases, the power running operation is performed, and the torque current reference indicates a positive value. After time t2, since the regenerative operation is performed, the value becomes a negative value, and returns to initial value at time t3.

FIG. 6 (g) shows the speed feedback ωfbk. The operation follows the internal speed command.

FIG. 6 (h) shows the DC voltage feedback VDCfbk. After the time t0 when the voltage drop of the AC power supply 1 occurs, the voltage rises, and the fall is suppressed after the time t1. When the AC power supply 1 recovers, the voltage drops after the time t2 and becomes equal to the initial value at the time t3.

In the initial condition of FIG. 6, the internal speed command, which is the output of the subtraction circuit 612, is a negative value because of the lowering and the regenerating operation. Therefore, the output of the comparator 626 is at the H level, and the input terminal B of the switching circuit 628, that is the output of the polarity inversion circuit 627 is selected. Namely, a value obtained by inverting the polarity of the output of the subtraction circuit 624 is inputted to the minus terminal input of the subtraction circuit 612 as a speed correction value. The subsequent operation is the same as the description of FIG. 4 except that the polarities of the external speed command and the internal speed command are reversed, and thus description thereof will be omitted.

As described above, the motor drive apparatus according to the first embodiment can continue operation without stopping even if the voltage of the AC power supply 1 decreases during the lowering operation and the regenerative operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

As described above, according to the embodiment of the present invention, when a voltage drop of the AC power supply occurs while the motor drive apparatus is operating the motor used for hoisting and lowering the hoist or the crane, etc., by detecting the voltage drop and correcting the speed command of the rotation speed of the motor, the motor drive apparatus that can prevent the motor drive apparatus from stopping and can continue the operation within the allowable range of the electric device can be provided.

EXPLANATION OF SYMBOLS 100 motor drive apparatus
1 AC power supply
2, 3 Circuit breaker
10 Instantaneous voltage drop detector
11 Transformer
12 UV detector
20 Filter unit
21, 22 Reactor
23 Capacitor
30 Electromagnetic switch
40 Input current detector
50 Converter
51 Smoothing capacitor
52 DC voltage detector
58 Converter control unit
59 Inverter control unit
60 Inverter
61 Speed reference setting unit
611 Rate generation circuit
613 Absolute value circuit
614, 620, 625, 630, 632 Setting circuit
615, 626, 633 Comparator
616, On delay
617 Inversion circuit
618, 619, AND circuit
623 First correction control circuit
634 Second correction control circuit
627 polarity inversion circuit
628 Switching circuit
629 Primary delay circuit
62, 64, 612, 621, 624, 631 Subtraction circuit
635 Limiter
641 Correction circuit
63 Speed controller
65 Current controller
66 PWM controller
67 Conversion circuit
70 Output current detector
80 Electromagnetic switch
90 Motor
91 Speed sensor

The invention claimed is:

1. A motor drive apparatus comprising,
a converter that receives an AC power from an AC power supply and supplies the AC power to a DC circuit;
an inverter that converts power from the DC circuit into a variable frequency AC power, and drives a motor;
a voltage drop detector circuit configured to detect a voltage drop of the AC power supply;
a converter control circuit configured to control the converter;
a DC voltage detector circuit configured to detect DC voltage of the DC circuit;
an inverter control circuit configured to control the inverter, the inverter control circuit includes:
a rotation speed detector circuit configured to detect a rotation speed of the motor;
a speed reference setting circuit configured to set the rotation speed of the motor;

a first circuit configured to detect a speed deviation which is deviation from an output of the rotation speed detector circuit and an internal speed command outputted from the speed reference setting circuit; and a second circuit configured to control an output current of the inverter according to the output of the first circuit detecting the speed deviation, wherein the speed reference setting circuit includes a correction circuit configured to correct an external speed command given from the outside, wherein the correction circuit is further configured to correct the external speed command according to a deviation between a detection value of the DC voltage detector circuit and a first reference value when a voltage drop signal is received from the voltage drop detector circuit, and set the corrected speed command as the output of the speed reference setting circuit, and wherein the correction circuit corrects the external speed command in a direction to decrease an absolute value of the rotation speed of the motor during power running and corrects the external speed command in a direction to increase the absolute value of the rotation speed of the motor during regeneration.

2. The motor drive apparatus according to claim 1, wherein, the motor is used for a hoist.

3. The motor drive apparatus according to claim 1, wherein the first reference value is a rated DC voltage of the DC circuit.

4. The motor drive apparatus according to claim 1, wherein the correction circuit corrects the external speed command in a direction to increase an absolute value of the rotation speed of the motor when the detected value of the DC voltage detector circuit exceeds a second reference value larger than the first reference value.

5. The motor drive apparatus according to claim 1, wherein the speed reference setting circuit stops the correction of the external speed command when the voltage drop detection signal from the voltage drop detector circuit continues beyond a first set time, and outputs a protection request signal.

6. A motor drive apparatus comprising, a converter that receives an AC power from an AC power supply and supplies it to a DC circuit;

an inverter that converts power from the DC circuit into a variable frequency AC power, and drives a motor;

a voltage drop detector circuit configured to detect a voltage drop of the AC power supply;

a converter control circuit configured to control the converter;

a DC voltage detector circuit configured to detect DC voltage of the DC circuit;

an inverter control circuit configured to control the inverter, the inverter control circuit includes, a rotation speed detector circuit configured to detect a rotation speed of the motor, a speed reference setting circuit configured to set the rotation speed of the motor, a first circuit configured to detect a speed deviation which is deviation from an output of the rotation speed detector circuit and an internal speed command outputted from the speed reference setting circuit, a second circuit configured to control an output current of the inverter according to the output of the first circuit detecting speed deviation, wherein the speed reference setting circuit includes a correction circuit configured to correct an external speed command given from the outside, wherein the correction circuit is further configured to correct the external speed command according to a deviation between a detection value of the DC voltage detector circuit and a first reference value when a voltage drop signal is received from the voltage drop detector circuit, and set the corrected speed command as the output of the speed reference setting circuit, wherein the correction circuit corrects the external speed command in a direction to increase an absolute value of the rotation speed of the motor when the detected value of the DC voltage detector circuit exceeds a second reference value larger than the first reference value.

* * * * *